United States Patent

Crawford

[15] 3,706,273
[45] Dec. 19, 1972

[54] FEED MECHANISM FOR HAY BALERS

[72] Inventor: Alexander Crawford, Warwick, England

[73] Assignee: Massey-Ferguson Services N.V., Curacao, Netherlands Antilles

[22] Filed: May 20, 1971

[21] Appl. No.: 145,361

[30] Foreign Application Priority Data

June 18, 1970 Great Britain.....................29,574/70

[52] U.S. Cl......................................100/189, 74/110
[51] Int. Cl. ...............................................B30b 1/00
[58] Field of Search ..74/25, 110; 100/179, 187, 189; 214/147

[56] References Cited

UNITED STATES PATENTS

| | | | |
|---|---|---|---|
| 2,556,737 | 6/1951 | Parsons | 74/110 |
| 3,213,783 | 10/1965 | May et al | 100/188 |
| 3,351,002 | 11/1967 | McDuffie | 100/189 |
| 3,464,346 | 9/1969 | Crane et al. | 100/189 |
| 3,486,439 | 12/1969 | May et al | 100/189 |
| 2,641,468 | 6/1953 | Jackson | 74/110 |
| 3,525,447 | 8/1970 | Witkko | 214/147 |

*Primary Examiner*—Milton Kaufman
*Assistant Examiner*—Wesley S. Ratliff, Jr.
*Attorney*—Gerhardt, Greenlee & Farris

[57] ABSTRACT

A hay baler with a bale chamber, a feed opening in one side wall of the chamber, a plunger in the bale chamber for compacting hay, a hay receiving platform extending laterally to one side of the bale chamber, a track mounted above the platform, a feeder carriage mounted on the track for movement along the track to convey hay from the platform and through the opening in one side wall of the chamber, and a drive transmission mechanism to reciprocate the feeder carriage. The drive transmission mechanism includes a resiliently extensible link pivotally connected at one end to the plunger, a floating link pivotally connected to the other end of the drive link, a connecting link pivotally interconnecting the floating link and the feeder carriage, and first and second swinging arms each pivotally connected at one end to the floating link at spaced apart positions along the length thereof and pivotally mounted on spaced apart pivot members on the bale chamber.

9 Claims, 3 Drawing Figures

FEED MECHANISM FOR HAY BALERS

This invention relates to drive transmission mechanisms and in particular to a drive transmission mechanism for the packer arms which feed crop material to a bale chamber in an agricultural baling machine.

In baling machines it is desirable that the operator of the machine has an unobstructed view of the pick-up and that the packer arms are easily accessible for un-plugging the arms if they get jammed. In known baling machines in which the reciprocating movement of the bale chamber plunger is used to drive the packer arms the view and access is obstructed by a guard under which the packer arm drive transmission linkage is housed.

An object of the invention is to provide a drive transmission mechanism which is relatively cheap to manufacture, occupies a minimun of space, thereby minimizing the size of its guard, and which has predetermined speed and dwell characteristics which are suitable for high speed operation.

According to the invention there is provided a drive transmission mechanism for transmitting reciprocating motion comprising a drive link pivotally connected at one end to a reciprocable drive mechanism, a floating link pivotally connected to the other end of the drive link, a connecting link pivotally interconnecting the floating link and a member mounted for reciprocating movement, and first and second swinging arms each pivotally connected at one end to the floating link at spaced apart positions along the length thereof, the swinging arms being pivotally mounted on respective spaced apart pivot members located at fixed positions relative to the floating link.

An embodiment of the invention will now be described by way of example with reference to the accompanying drawings in which.

Figure 1:
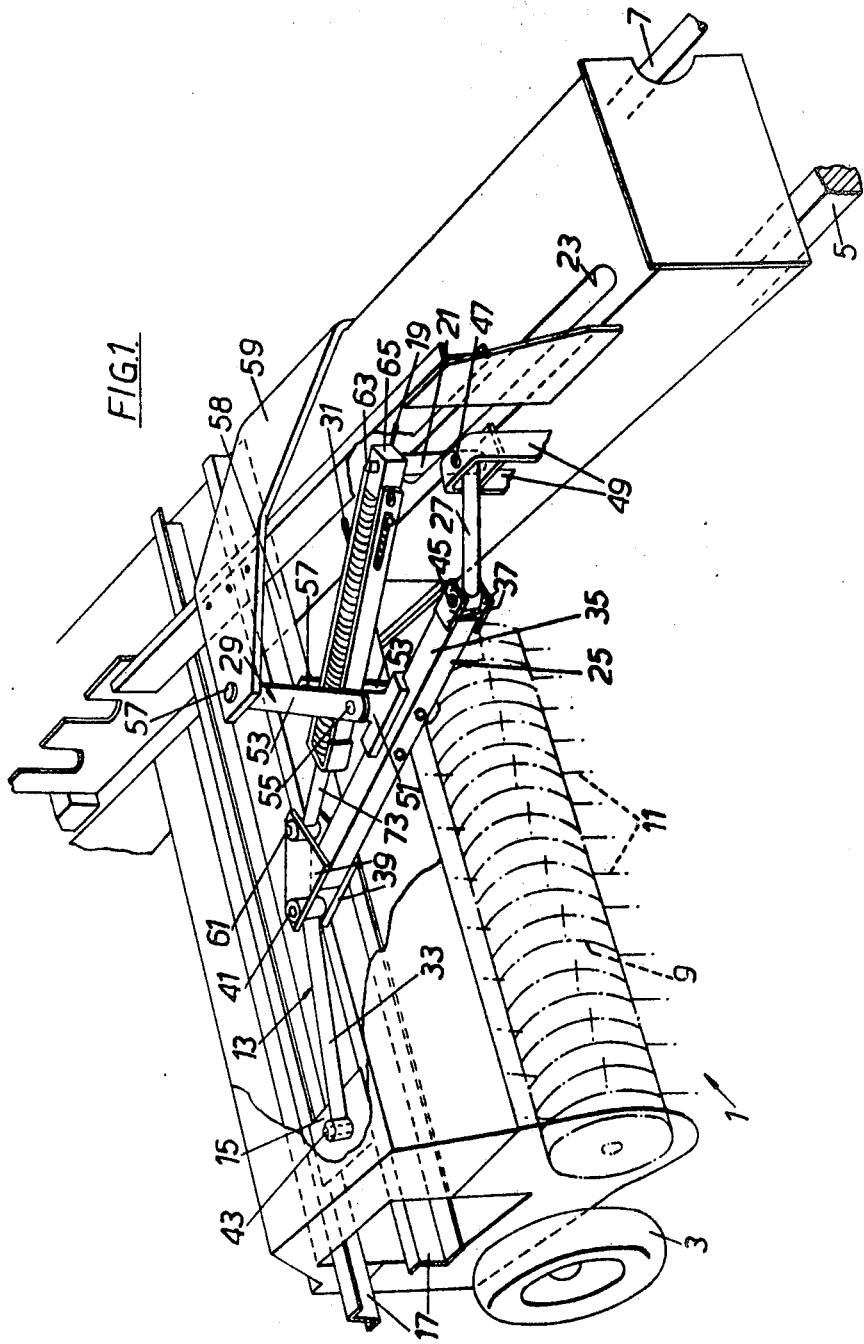
FIG. 1 shows a perspective view of a baler, with parts of the cladding of the machine removed.

As shown in FIG. 1 a baler 1 mounted on ground wheels 3 has a drawbar 5 whereby it is hauled by a tractor (not shown). A drive shaft 7 is connected to the tractor's power take-off shaft to drive the crop pick-up and bale forming and tying mechanisms of the baler.

A rotatable pick-up reel 9 having tines 11 is drivably coupled to shaft 7 and arranged to pick up crop from the ground and pass it in a fore/aft direction towards a feed chamber 13.

A carriage 15 is mounted for reciprocating movement on a pair of spaced-apart transverse rails 17 above the feed chamber 13. The carriage 15 carries a pair of packer arms (not shown) extending downwardly into the feed chamber 13.

A drive transmission mechanism indicated generally by reference numeral 19 connects a plunger 21 mounted on a reciprocatable crosshead (not shown) with the carriage 15 to drive the carriage up and down the length of the rails 17. The plunger 21 is driven up and down the length of a slot 23 by a reciprocating drive mechanism (not shown) comprising a crank driven from the shaft 7, and associated connecting rods coupled to the crosshead.

The drive transmission mechanism 19 comprises a floating link 25 mounted for floating movement on the body structure of the baler by means of first and second swinging arms 27 and 29, respectively. The floating link 25 is connected to the plunger 21 by a drive link 31 and is connected to the carriage 15 by a connecting link 33.

The floating link 25 comprises a box-section beam 35 having first and second pairs of plates 37 and 39 rigidly secured to opposite sides of the beam, one pair at each end.

The connecting link 33 is pivotally connected at 41 to the second pair of plates 39 and at 43 to the carriage 15. The first swinging arm 27 is pivotally connected at 45 to the first pair of plates 37 and at 47 to a U-shaped bracket 49 rigidly secured to the baler's body structure.

A trunnion 51 is bolted to the beam 25 intermediate the ends of the beam, and a pair of vertically-spaced links 53 constituting the second swinging arm 29 is connected to the trunnion for pivotal movement about a pivot axis 55. The ends of the links 53 remote from the trunnion 51 are pivotally mounted at vertically aligned positions 57 on respective support brackets 59 forming part of the baler's body structure.

One end of the drive link 31 is pivotally connected at 61 to the plates 39, and the other end is pivotally connected to a spigot 63 on the plunger 21.

Figure 2:
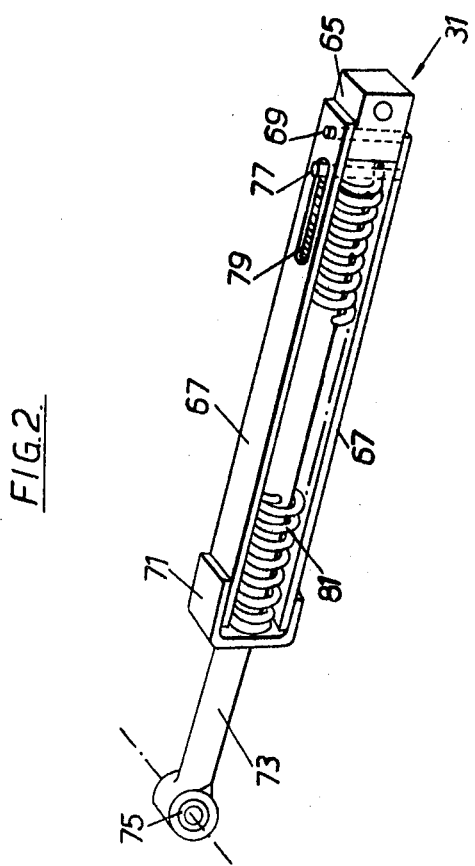
FIG. 2 shows a perspective view of a drive link forming part of a drive transmission mechanism illustrated in FIG. 1.

As shown in FIG. 2, the drive link 31 comprises a trunnion 65 and a fabricated elongated U-shaped frame. The frame comprises a pair of elongated side arms 67 pivoted at 69 on the trunnion 65 and a U-shaped end cap 71 rigidly interconnecting the arms 67 at their ends remote from the trunnion. A tube 73 having an eye 75 at one end and a transverse pin 77 secured to the other end extends through a clearance opening in the end cap 71. The opposite ends of the pin 77 are received in elongated slots 79 formed in the arms 67, and a coiled compression spring 81 acting between the end cap 71 and the pin 77 tends to hold the pin 77 against the end of the slot remote from the end cap 71. It will be appreciated that the construction of drive link 31 is such that it is resiliently extensible under the action of tensile forces, but rigid under the action of compressive forces.

Figure 3:
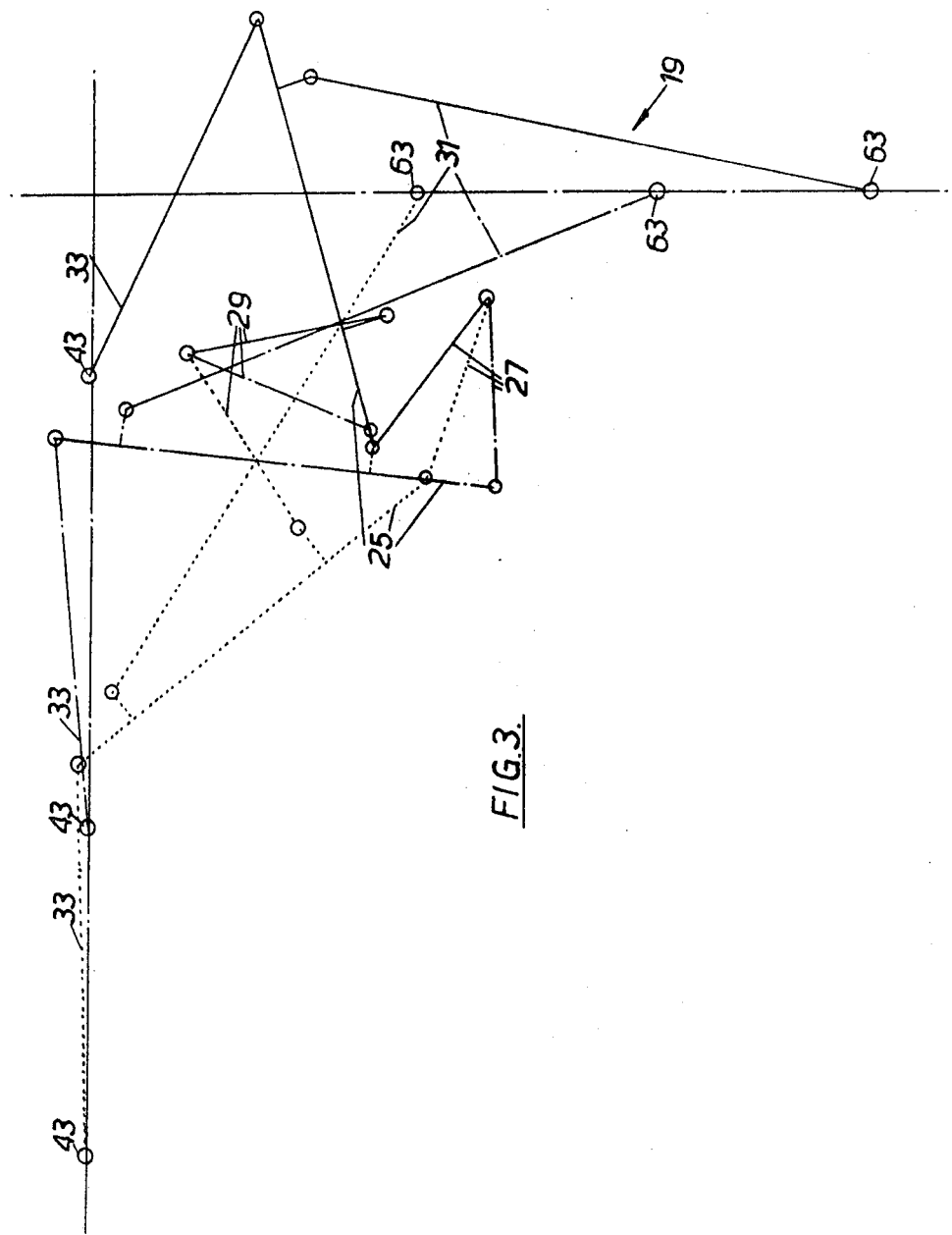
FIG. 3 shows, diagrammatically, the relative positions of the main components of the drive transmission mechanism of FIG. 1 at the two limits of their reciprocating movement and at an intermediate position.

The manner of operation of the transmission mechanism is illustrated diagrammatically in FIG. 3 in which the full lines indicate the relative positions of the components at one end of their stroke, the dotted lines the relative positions of the components at the other end of their stroke, and the chain dotted lines indicate an intermediate position. Reciprocating movement of plunger 21 along the slot 23 causes corresponding reciprocating movement of carriage 15 along rails 17. It will be noted that the stroke of carriage 15 is considerably longer than that of plunger 21.

It has previously been proposed to provide a drive transmission mechanism for substantially the same purpose as the mechanism 19 described above, but in which no element corresponding to the first and second swinging arms 27, 29 of the embodiment described above is provided, and in which the end remote from the carriage of the link corresponding to floating link 25 is pivotally mounted on a fixed supporting structure located above and extending forwardly of the pick-up 9 the said link therefore being in no sense a floating link. The embodiment described above has the advantages over this previously proposed mechanism that it requires less supporting structure, less guarding, provides the tractor driver with a less restricted view of the baler's feed mechanism during work, and makes unplugging of the baler easier.

I claim:

1. A drive transmission mechanism for transmitting reciprocating motion comprising a drive link pivotally connected at one end to a reciprocable drive member, a floating link pivotally connected to the other end of the drive link, a connecting link pivotally interconnecting the floating link and a member mounted for reciprocating movement, and first and second swinging arms each pivotally connected at one end to the floating link at spaced apart positions along the length thereof, the swinging arms being pivotally mounted on respective spaced apart pivot members located at fixed positions relative to the floating link.

2. A mechanism as claimed in claim 1, in which said drive link is resiliently extensible.

3. A mechanism as claimed in claim 1 in which said floating link comprises a box-section beam having first and second pairs of plates, one pair at each end and the plates of such pair on opposite sides of the beam.

4. A mechanism as claimed in claim 3, in which said connecting link is connected through said second pair of plates to the floating link.

5. A mechanism as claimed in claim 3 in which said first swinging arm is connected through said first pair of plates to the floating link.

6. A mechanism as claimed in claim 3 in which said drive link is connected to said floating link through first pair of plates at a point off-set from the longitudinal axis of the floating link.

7. A mechanism as claimed in claim 1 in which said second swinging arm is formed as a pair of spaced parallel links each connected to said floating link through a trunnion located intermediate the ends of the floating link.

8. A mechanism as claimed in claim 1 in which said drive link comprises a pair of side arms pivotally connected at one end by a trunnion block adapted to be reciprocated at at the other end by a U-shaped end cap, a rod adapted for connection at one end to the floating link and passing through an aperture in the end cap, a pin provided at the other end of the rod and cooperable with a slot in one of the side arms and compression spring surrounding said rod and extending between the end cap and said pin.

9. A hay baler comprising a fore and aft extending bale chamber having a feed opening in one side wall thereof, a plunger reciprocable in the bale chamber from a retracted position forwardly of said opening to an extended position rearwardly of said opening, a hay receiving platform extending laterally from said one side wall, a track mounted above said platform, a feeder carriage with crop feeding means mounted on the track for movement along the track to convey hay from the hay receiving platform through the feed opening in one side wall of the bale chamber, and drive means connecting the feeder carriage to the plunger to reciprocate the feeder carriage back and forth characterized by a drive link pivotally connected at one end to the plunger, a floating link pivotally connected to the other end of the drive link, a first and second swinging arms each pivotally connected at one end to the floating link at spaced apart positions along the length thereof and pivotally mounted on the bale chamber at spaced apart positions, and a connecting link pivotally connected to the feeder carriage and the floating link.

* * * * *